United States Patent [19]

Waters

[11] Patent Number: 4,931,514

[45] Date of Patent: Jun. 5, 1990

[54] ADMIXING METAL SALT PROMOTOR, INITIATOR AND (M)ETHYL ACETOACETATE TO CURE VINYL ESTERS

[76] Inventor: William D. Waters, 10231 South Quebec, Tulsa, Okla. 74137

[21] Appl. No.: 205,549

[22] Filed: Jun. 10, 1988

Related U.S. Application Data

[63] Continuation of Ser. No. 916,022, Oct. 6, 1986, abandoned.

[51] Int. Cl.$^5$ .................... C08G 59/16; C08L 63/10
[52] U.S. Cl. .................................... 525/531; 525/922
[58] Field of Search ................. 525/529, 531, 922

[56] References Cited

U.S. PATENT DOCUMENTS

| 4,173,593 | 11/1979 | Smith et al. | 525/529 |
| 4,336,359 | 6/1982 | Messick | 525/531 |
| 4,343,921 | 8/1982 | Piestert | 525/531 |
| 4,603,182 | 7/1986 | Markovitz | 525/529 |

FOREIGN PATENT DOCUMENTS 1115578  5/1968  United Kingdom .

OTHER PUBLICATIONS

Chemical Abstracts, vol. 87, Apr. 14, 1977, p. 39, Abstract No. 54101y, Awaji et al, "Hardeners for Thermosetting Resin Compositions".
Chemical Abstracts, vol. 90, Feb. 13, 1979, p. 107, Abstract No. 205954u, Nakamura, T., "Improvement of the Finishing of Powdered Coatings".
Chemical Abstracts, vol. 94, Nov. 13, 1980, p. 42, Abstract Nos. 157838t and 157839u, Tokyo Shibaura Electric, "Heat Resistant Resin Compositions".
Chemical Abstracts, vol. 106, Feb. 8, 1985, p. 100, Abstract No. 34771z, Masayuki et al, "Photocurable Epoxy Resin Compositions".

*Primary Examiner*—Lewis T. Jacobs
*Assistant Examiner*—Robert E. L. Sellers, II

[57] ABSTRACT

A method of accelerating the curing of a vinyl ester resin (e.g., vinyl ester adhesives) and related compositions comprising: a vinyl ester resin (e.g., bisphenol/epichlorohydrin condensation polymer end capped with methacrylic or ethylacrylic acid); a vinyl monomer (e.g., styrene or the like); a free radical initiator (e.g., MEKP); a free radical promoter (e.g., polyvalent metal naphthenates, polyvalent metal octoates or the like); and an accelerator selected from the group consisting of methyl acetoacetate and ethyl acetoacetate, such compositions are characterized by gel times under ten minutes and physical properties approaching fully cured values within one hour.

13 Claims, No Drawings

ADMIXING METAL SALT PROMOTOR, INITIATOR AND (M)ETHYL ACETOACETATE TO CURE VINYL ESTERS

This is a continuation of co-pending application Ser. No. 916,022 filed on Oct. 6, 1986, now abandoned.

BACKGROUND OF THE INVENTION

1. Field of the Invention

This invention relates to a method of accelerating the curing of a vinyl ester resin. More specifically, the invention relates to the room temperature accelerating of vinyl ester adhesives.

2. Description of the Prior Art

It is generally known that the rate of reaction for radical polymerization can be enhanced by application of heat or ultra-violet light to activate (decompose into radicals) the free radical initiator or, in some instances, by the presence of a promoter/accelerator (e.g., polyvalent metal naphthenates or octoates, tertiary amines or mercaptans). Thus, it is known that in the case of the formation of cross-linked structure by the addition of a free radical initiator (e.g., benzoyl peroxide, or methyl ethyl ketone peroxide) to a polyester resin (which for purposes of this invention refers to a polymer having unsaturation distributed in the backbone) in a reaction monomer (e.g., styrene) admixture, the cross-linking reaction (curing) can be sped up by the addition of an accelerator (e.g., cobalt naphthenate or dimethylamine) particularly in room temperature curing applications. More specifically, the cross-linking of an unsaturated polyester resin based on bisphenol A and fumaric acid with styrene monomer and methyl ethyl ketone peroxide (MEKP) with a cobalt soap promoter has been reported in chemical literature as being copromoted by dimethylaniline (DMA), ethyl acetoacetate (EAA) and methyl acetoacetate (MAA). However, in the case of accelerating, at room temperature, a similar admixture containing a vinyl ester resin (which for purposes of this invention refers to a polymer having only terminal unsaturation) only the toxic N,N, dimethylaniline is known as a copromoter/accelerator.

SUMMARY OF THE INVENTION

In view of the prior art, the present invention provides a method of accelerating the curing of a vinyl ester resin without the use of toxic N,N dimethylaniline. More specifically, the present invention provides for accelerating the curing of vinyl ester adhesives, starting at room temperature, and resulting in gel times of under ten minutes and physical properties approaching full cure in one hour.

Thus, the method of accelerating the curing of a vinyl ester resin at essentially room temperature, according to the present invention, comprises the steps of:

(a) admixing a vinyl ester resin with a vinyl monomer polyvalent metal salt promoter;

(b) adding to the admixture of step (a) an effective amount of a free radical initiator; and (c) adding to the admixture of step (a) an effective amount of an accelerator selected from the group consisting of methyl acetoacetate and ethyl acetoacetate.

Preferably, the vinyl ester resin with vinyl monomer further comprises an effective amount of at least one filler producing a vinyl ester adhesive. In one particular preferred embodiment, the vinyl ester resin is formed from the reaction of bisphenol A and excess epichlorohydrin followed by reacting the terminal epoxy groups with an unsaturated acid selected from the group consisting of mathacrylic acid and acrylic acid wherein the vinyl ester resin is further characterized by a WPE of from about 180 to about 2,000 wherein the vinyl monomer is styrene, wherein the polyvalent metal salt promoter is cobalt octoate and the free radical initiator is methyl ethyl ketone peroxide.

It is an object of the present invention to provide a non-toxic accelerator that is effective at room temperature to promote the curing of vinyl ester adhesives. It is a further object to provide such an accelerator system with gel times of less than ten minutes and substantially cured Barcol hardness within one hour. Fulfillment of these objects and the presence and fulfillment of additional objects will become apparent upon complete reading of the specification taken in conjunction with the attached claims.

DESCRIPTION OF THE PREFERRED EMBODIMENTS

The improved method of accelerating vinyl ester resins and vinyl ester adhesives according to the present invention can be viewed as involving a three component system or admixture. The first component is the resin or adhesive. The second component is the catalyst or more specifically, the free radical initiator and the third component is the accelerator or copromoter. Preferably, the first component is a blend or admixture of resins, unreacted monomer, fillers and promoters. While the second and third components of the overall system can be pure compounds or solutions as described in more detail later.

Preferably, the resin component according to the present invention involves an admixture of a vinyl ester resin, a vinyl monomer and at least one promoter. Conveniently, these ingredients are to be preblended and mixed prior to final use. However, it should be appreciated that for specific applications the blending and mixing of various components can be generally in any order desired and as such, the following description should not be viewed as being unduly limiting for purposes of the present invention.

Preferably, the vinyl ester polymer employed according to the present invention is a condensation polymer derived from reacting bisphenol A with sufficient excess of epichlorohydrin to result in terminal epoxy groups of what is otherwise a substantially linear, unsaturated polyester backbone. The degree of polymerization according to the present invention is controlled such that the resulting polymer has a final average weight per epoxy group (WPE) of at least 180. To this epoxy resin is then added a stoichiometric amount of an unsaturated acid sufficient to end cap the polymer. Preferably, the unsaturated acid is either methacrylic acid, acrylic acid or mixtures thereof. The resulting vinyl ester resin is then employed as the major component in the uncured vinyl ester resin admixture (the first component). The other minor component (but present in significant quantities) is the vinyl monomer. The vinyl monomer can be essentially any unsaturated cross-linking agent as generally known in the art such as styrene, methyl styrene and other substituted styrenes as well as derivatives thereof, divinylbenzene or the like. The preferred cross-linking agent to be used in the present invention is styrene. Similarly, the promoter to be employed in the present invention can be any such agent as generally known in the art. Preferably, the promoter is a polyvalent metal salt of an organic acid (such as a cobalt or magnesium soap). Preferably, the promoter is cobalt naphthenate or cobalt octoate.

In the case of a vinyl ester resin, the vinyl ester polymer and vinyl monomer are blended in any proportion generally known in the art (typically, 30 to 50% by weight monomer) and an effective but minor amount (typically, a fraction of a percent) of the promoter is added to this admixture. In the case of a vinyl ester adhesive, the vinyl ester resin described above is further combined with one or more relatively inert additives such as to impart the desired physical characteristics associated with the additive, also as generally known in the art. This would include such additives as various synthetic fibers and powders, including, but not limited to, polyolefins, such as polyethylene, polypropylene and the like, glass fibers, mineral fillers and similar materials. The quantity of filler added to the vinyl ester resin to produce the vinyl ester adhesive can vary according to the desired properties to be achieved and, as such, can represent a substantial portion of the final admixture. Various methods as generally known in the art can be employed to blend and mix the individual components, thus, producing the final vinyl ester adhesive mixture.

The free radical initiator according to the present invention is generally any such agent known to effectively catalyze the curing and cross-linking of a vinyl monomer with a terminally unsaturated vinyl ester polymer. Preferably, methyl ethyl ketone peroxide is to be employed. The methyl ethyl ketone peroxide can be conveniently used in an undiluted form as the second component. Typically, the MEKP is present from a fraction of a percent up to several weight percent depending on the particular application and composition of the vinyl ester resin or adhesive. Similarly, the accelerator, third component, can be employed in an undiluted pure state. The accelerator, according to the present invention, is selected from the group consisting of methyl acetoacetate, ethyl acetoacetate, and mixtures thereof. Preferably, the methyl acetoacetate is employed. An effective amount of the accelerator will depend on the particular application and vinyl ester resin admixture and will typically involve from a fraction of a percent up to a few weight percent.

The following Examples are presented to further illustrate the novel method and related compositions according to the present invention, how they are prepared and the unexpected results and properties associated with the use of the present invention. Example I presents a typical vinyl ester adhesive composition according to the present invention.

EXAMPLE I

To a 35/65 weight mixture of styrene monomer and vinyl ester polymer was added cobalt octoate, low density polyethylene powder, polyethylene fibers, powdered wollastonite and chopped strands of fiberglass in the proportions presented in Table I. The vinyl ester prepolymer employed was derived from the reaction of bisphenol A and epichlorohydrin which had been polymerized to approximately a WPE of about 900 in the presence of excess epichlorohydrin prior to the end capping of the polymer with acrylic acid. In preparing the vinyl ester adhesive, 60 weight percent of the resin was initially charged to a mixer and the cobalt octoate was then added and followed with 5 minutes of mixing.

The powdered wollastonite and chopped fiberglass were then added followed by an additional 10 minutes of mixing. The polyethylene fibers were then added slowly, allowing all material to wet out followed by the low density polyethylene and a subsequent 2-minutes of mixing. The remainder of the preweighed amount of the polymer/monomer resin was then slowly added to the mixture while the mixer was running. The mixer continued to operate for an additional 15 minutes, completing the first component. The final mix was then canned and packaged in quantities of 280 grams (½ pint cans) and a 6.2 gram plastic tube of methyl ethyl ketone peroxide was added along with 2.0 grams of methyl acetoacetate in a sealed tetrafluroethylene (½ dram) vial completing an adhesive kit used in practicing the present invention.

TABLE I

|  | WT. % |
|---|---|
| Vinyl ester resin/styrene | 73.9 |
| Cobalt octoate | .35 |
| PE FN 10[1] | 10.41 |
| Fybrel 380E[2] | 3.74 |
| Wollastokup G174 0.5[3] | 6.94 |
| 1/32" Milled fiber[4] | 4.67 |

[1]Powdered LDPE - U.S. Industrial Chemicals Co.
[2]Polyethylene fibers - Crown Zellerbach
[3]Powdered wollastonite - Processed Minerals, Inc.
[4]Chopped strand fibrous glass - Owens Corning

EXAMPLE II

In order to compare the use of methyl acetoacetate and ethyl acetoacetate as accelerators or copromoters relative to the toxic dimethylaniline, the curing of a series of five compositions were monitored for gel time and Barcol hardness. Comparative data describing the compositions and the resulting properties are presented in the following Table.

TABLE II

|  | 1 | 2 | 3 | 4 | 5 |
|---|---|---|---|---|---|
| VEA (grams) | 100 | 100 | 100 | 100 | 100 |
| DMA | .3 | .5 |  |  |  |
| C.O.[1] | .25 | .25 |  | .25 | .25 |
| EAA |  |  | .3 |  |  |
| MAA |  |  |  | .3 |  |
| DMAA |  |  |  |  | .3 |
| MEKP | 1.5 | 1.5 | 1.5 | 1.5 | 1.5 |
| Gel Time (Min) |  |  |  |  |  |
| Barcol 1 hr | 15 | 84 | 20 |  |  |
| 2 hr | 25 | 27 | 28 | 37 | 34 |
| 3 hr | 27 | 27 | 29 | 37 | 34 |
| 4 hr | 27 | 27 | 34 |  |  |
| 5 hr | 27 | 27 | 34 |  |  |
| 6 hr | 27 | 27 | 37 |  |  |
| Overnight | 27 | 27 | 37 | 40 | 35 |

[1]Cobalt octoate
[2]Dimethyl acetoacetate

EXAMPLE III

In order to evaluate the gel times at various temperatures, a series of five vinyl ester adhesives (VEA) prepared according to Example I were cured using methyl ethyl ketone peroxide as the free radical initiator and methyl acetoacetate as the accelerator. The data associated with these runs are presented in the following Table.

TABLE III

| (VEA/MA) | 100 |
|---|---|
| (MAA) | 0.7 |

TABLE III-continued

| MEKP | 2.21 |
|---|---|

Results:

| Temp. (°F.) | Gel Time (Min.) |
|---|---|
| 70 | 10 |
| 75 | 9.5 |
| 80 | 7 |
| 85 | 6.5 |
| 90 | 5.5 |

EXAMPLE IV

In order to further evaluate the use of methyl acetoacetate as an accelerator, the room temperature curing of a series of ten runs using a vinyl ester adhesive (VEA) prepared as described in Example I were monitored. The first five runs involved a vinyl ester polymer terminally capped with acrylic acid (A) and the final five runs involved a vinyl ester polymer terminally capped with methacrylic acid (MA). The gel time and Barcol hardness were recorded. Data related to the ten runs are presented in the following table.

TABLE IV

| | 1 | 2 | 3 | 4 | 5 | 6 | 7 | 8 | 9 | 10 |
|---|---|---|---|---|---|---|---|---|---|---|
| VEA/A | | | | | | 100 | 100 | 100 | 100 | 100 |
| VEA/MA | 100 | 100 | 100 | 100 | 100 | | | | | |
| C.O. | .47 | .71 | .53 | .53 | .47 | .47 | .71 | .53 | .53 | .47 |
| MAA | .50 | .56 | .74 | .56 | | .50 | .56 | .74 | .56 | |
| MEKP | 2.99 | 3.23 | 3.23 | 3.93 | 2.99 | 2.99 | 3.23 | 3.23 | 3.93 | 2.99 |
| DMA (grams) | | | | | .50 | | | | | .50 |
| Gel Time | 9 | 8 | 8 | 7 | 7 | 7 | 7 | 7 | 7 | 1.5 |
| Barcol 30 | 30 | 30 | 28 | 28 | 15 | 0 | 0 | 15 | 0 | 0 |
| 60 | 36 | 36 | 37 | 36 | 30–36 | 28 | 28 | 28 | 26 | 0 |
| 120 | 36 | 38 | 38 | 36 | 30 | 28 | 28 | 26 | 26 | 0 |
| 24 hours (minutes) | 36 | 36 | 40 | 37 | 30 | 30 | 30 | 30 | 26 | 0 |

EXAMPLE V

In order to evaluate the physical strength of the vinyl ester adhesives according to the present invention relative to the use of dimethylaniline, tensile strengths of 3 inch fiber reinforced plastic (FRP) pipe specimens adhesively bonded by FRP couplings were tested. The respective compositions of the adhesives employed are presented below in Table V along with the resulting tensile strength measured for the adhesively bonded pipe fittings. In order to allow the DMA to be operative at room temperature, N pyrolydone was added. Five test specimens were prepared with the intent of measuring the tensile strength after 30, 60, and 102 minutes as well as 6 hours and 24 hours. However, and as seen in Table V, both adhesives after 60 minutes were sufficient to produce failure in the fitting rather than in the adhesive bond.

TABLE V

| | 1 | 2 |
|---|---|---|
| Vinyl ester adhesive (grams) | 100 | 100 |
| 50/50 DMA/Styrene | 1.0 | — |
| 50/50 MAA/Styrene | — | 2.0 |
| MEKP | — | 2.21 |
| N pyrolydone | 2.0 | — |
| Results: | | |
| Tensile at 30 Min. (lbs.) | 18,700* | 9,300 |
| Tensile at 60 Min | 18,200* | 15,300* |

*Fitting Failed

In view of the above Examples, it is concluded that methyl acetoacetate and ethyl acetoacetate accelerate the curing of vinyl ester adhesives starting at room temperature without the use of objectionable or otherwise toxic copromoters. Further, such accelerated vinyl ester adhesives exhibit gel times highly compatible with field repairing of FRP pipe and the like, the physical properties associated with the fully cured adhesive bond being achieved in approximately one hour. As such, the present invention provides a safe and reliable system for quick repair of high pressure plastic pipes and fittings and the like at room temperature and allows the repaired system to be placed back in service within an hour.

Having thus described and exemplified the preferred embodiments with a certain degree of particularity, it is to be understood that the invention is not to be limited to the embodiments set forth herein for purposes of exemplification, but is to be limited only by the scope of the attached claims, including a full range of equivalents to which each element thereof is entitled.

I claim:

1. A method of accelerating the curing of a vinyl ester resin at essentially room temperature consisting of the steps of:
    (a) admixing for every 100 parts by weight of a vinyl ester resin, from about 43 up to 100 parts by weight of a vinyl monomer, and from about 0.47 to about 0.71 parts by weight of a polyvalent metal salt promoter;
    (b) adding to the admixture of step (a) an effective amount of a free radical initiator;
    (c) adding to the admixture of step (a) an effective amount of an accelerator selected from the group consisting of a methyl acetoacetate and ethyl acetoacetate to accelerate the curing of the admixture of step (b) and
    (d) curing the admixture of step (c) at essentially room temperature with a gel time under about ten minutes and a cured Barcol hardness within one hour.

2. A method of claim 1 wherein said accelerator is added to said admixture of a vinyl ester resin, vinyl monomer and polyvalent metal salt promoter prior to the addition of said free radical initiator.

3. A method of claim 1 wherein said admixture of a vinyl ester resin with a vinyl monomer further comprises an effective amount of at least one filler producing a vinyl ester adhesive.

4. A method of claim 2 wherein said admixture of a vinyl ester resin with a vinyl monomer further comprises an effective amount of at least one filler producing a vinyl ester adhesive.

5. A method of claim 1 wherein said vinyl ester resin is formed from the reaction of bisphenol A and excess epichlorohydrin, characterized by an average weight per epoxy group, WPE, of from about 180 to about 2000, followed by reacting the terminal epoxy groups with an unsaturated acid selected from the group consisting of methacrylic acid and acrylic acid, wherein said vinyl monomer is styrene, wherein said polyvalent metal salt promoter is cobalt octoate and said free radical initiator is methyl ethyl ketone peroxide.

6. A method of claim 2 wherein said vinyl ester resin is formed from the reaction of bisphenol A and excess epichlorohydrin, characterized by an average weight per epoxy group, WPE, of from about 180 to about 2000, followed by reacting the terminal epoxy groups with an unsaturated acid selected from the group consisting of methacrylic acid and acrylic acid, wherein said vinyl monomer is styrene, wherein said polyvalent metal salt promoter is cobalt octoate and said free radical initiator is methyl ethyl ketone peroxide.

7. A method of claim 3 wherein said vinyl ester resin is formed from the reaction of bisphenol A and excess epichlorohydrin, characterized by an average weight per epoxy group, WPE, of from about 180 to about 2000, followed by reacting the terminal epoxy groups with an unsaturated acid selected from the group consisting of methacrylic acid and acrylic acid, wherein said vinyl monomer is styrene, wherein said polyvalent metal salt promoter is cobalt octoate and said free radical initiator is methyl ethyl ketone peroxide.

8. A method of claim 4 wherein said vinyl ester resin is formed from the reaction of bisphenol A and excess epichlorohydrin, characterized by an average weight per epoxy group, WPE, of from about 180 to about 2000, followed by reacting the terminal epoxy groups with an unsaturated acid selected from the group consisting of methacrylic acid and acrylic acid, wherein said vinyl monomer is styrene, wherein said polyvalent metal salt promoter is cobalt octoate and said free radical initiator is methyl ethyl ketone peroxide.

9. A method of claim 7 wherein for every 100 parts by weight of combined vinyl ester resin, styrene and filler there is about 2.1 parts by weight methyl ethyl ketone peroxide and about 0.7 parts by weight accelerator.

10. A method of accelerating the curing of a vinyl ester resin at essentially room temperature consisting of the steps of:
(a) preparing an admixture comprising for every 100 parts by weight of a vinyl ester resin, from about 43 to about 100 parts by weight of a vinyl monomer, and from about 0.47 to about 0.71 parts by weight of a polyvalent metal salt promoter;
(b) preparing an admixture comprising a free radical initiator and an accelerator selected from the group consisting of methyl acetoacetate, ethyl acetoacetate and mixtures thereof; and
(c) adding to the admixture of step (a) an effective amount of the admixture of step (b) to initiate the free radical crosslinking of the vinyl monomer and vinyl ester resin and to accelerate the curing of said crosslinking reaction; and
(d) curing the admixture of step (c) at essentially room temperature with a gel time under about ten minutes and a cured Barcol hardness within one hour.

11. A method of claim 10 wherein said admixture of a vinyl ester resin, vinyl monomer, and polyvalent metal salt promoter further comprises an effective amount of at least one filler producing a vinyl ester adhesive resin.

12. A method of accelerating the curing of a vinyl ester resin adhesive at essentially room temperature consisting of the steps of:
(a) preparing an admixture comprising for every 100 parts by weight of a vinyl ester resin derived by end capping a bisphenol A/epichlorohydrin condensation polymer having an average weight per epoxy group, WPE, of about 900 with an unsaturated acid, from about 43 to about 100 parts by weight of a vinyl monomer, from about 0.47 to about 0.71 parts by weight of a polyvalent metal salt promoter, and an effective amount of at least one inert filler producing a vinyl ester adhesive resin;
(b) adding to the admixture prepared in step (a), an effective amount of a second admixture of a free radical initiator and an accelerator selected from the group consisting of methyl acetoacetate, ethyl acetoacetate and mixtures thereof; and
(c) curing the admixture of step (b) at essentially room temperature with a gel time under about ten minutes and a cured Barcol hardness within one hour to form a crosslinked vinyl ester adhesive.

13. A method of accelerating the curing of a vinyl ester resin adhesive at essentially room temperature consisting of the steps of:
(a) preparing an admixture comprising for every 100 parts by weight of a vinyl ester resin derived by end capping a bisphenol A/epichlorohydrin condensation polymer having an average weight per epoxy group, WPE, of about 900 with an unsaturated acid, from about 43 to about 100 parts by weight of a vinyl monomer, and from about 0.47 to about 0.71 parts by weight of a polyvalent salt promoter, and an effective amount of at least one inert filler producing a vinyl ester adhesive resin;
(b) preparing an admixture comprising a free radical initiator and an accelerator selected from the group consisting of methyl acetoacetate, ethyl acetoacetate and mixtures thereof;
(c) adding to the admixture of step (a) an effective amount of the admixture of step (b) to initiate the free radical crosslinking of the vinyl monomer and vinyl ester resin and to accelerate the curing of said crosslinking reaction; and
(d) curing the admixture of step (c) at essentially room temperature with a gel time under about ten minutes and a cured Barcol hardness within one hour.

* * * * *